United States Patent Office 3,378,381
Patented Apr. 16, 1968

3,378,381
EMULSION FOR PRESERVATION AND
FIREPROOFING OF WOOD
Samuel M. Draganov, Tustin, Calif., assignor to United States Borax & Chemical Corporation, Los Angeles, Calif., a corporation of Nevada
No Drawing. Filed Oct. 9, 1963, Ser. No. 314,846
13 Claims. (Cl. 106—15)

This invention relates to the preservation and fireproofing of wood, and more particularly relates to novel, stable emulsion compositions and a single-step method for preserving and fireproofing wood with said compositions.

There are provided by the present invention stable oil-in-water emulsions in which the oil phase has an average particle diameter of not more than about seven microns. The emulsion comprises a water phase containing from about 5% to about 40% by weight of an inorganic oxygen-bearing borate, and from about 0.5% to about 2% by weight of an alkaline lignin sulfonate as an emulsifying agent. The oil phase contains from about 0.1% to about 10% by weight of a chlorinated phenol, and from about 0.5% to about 25% by weight of a hydrocarbon wax. The weight ratio of the oil:water phases is in the range of from about 1:1 to about 2.5:1.

Also provided by this invention is a single-step method for the preservation and fireproofing of wood by impregnating the wood with the novel emulsion of the present invention. The method provides, in a single-step treatment, a weatherproof, fire-retardant wood having no discoloration. Thus, the treated wood can be refinished and painted or varnished for aesthetic appeal. Also, the treated wood is non-corrosive to metal fixtures and will not cause skin irritation, making it useful in the construction of guard rails, porch railings, pillars, and the like.

It is of importance to note that the emulsions of the present invention are of the oil-in-water type wherein the oil phase is dispersed in the water in a finely divided state. The oil phase must have an average particle diameter of not more than about seven microns and, preferably, in the range of from about one to about three microns. It has been found that only with such an oil-in-water emulsion is it possible to obtain a stable emulsion for impregnating timber in which there is an absolute minimum of "bleeding" when the timber is exposed to the weather. "Bleeding" is when the timber rejects the impregnants and they form on the surface. Additionally, with the present oil-in-water emulsions it is possible to introduce into the wood relatively greater quantities of the inorganic borates giving the wood greater protection against fire. Also, it is possible to obtain a high degree of protection against rot and insects with lesser amounts of the cholrinated phenols.

The stable emulsions of the present invention can be prepared by adding the ingredients to a homogenizer or a colloid mill. In a preferred procedure, the emulsion is prepared by adding a solution of the inorganic borates containing the emulsifying agent to a colloid mill while the mill is in operation. Then, while continuing to add the aqueous solution, the oil solution of chlorinated phenol and wax is slowly added to the mixture at a slower rate than the aqueous solution. When the aqueous borate solution is exhausted, the emulsion thus far prepared is recycled back through the colloid mill in place of the borate solution and the addition of the oil solution is continued until the desired phase ratio has been achieved.

The ratio of oil phase to water phase is in the range of about 1:1 to about 2.5:1, with a ratio of about 1.5:1 to 2:1 being preferred.

The inorganic oxygen-bearing borates which can be used include the alkali metal tetraborates in their various hydrated forms, such as borax and anhydrous borax, boric acid and anhydrous boric acid, sodium pentaborate, lithium pentaborate, ammonium biborate, sodium metaborate, metaboric acid, calcium metaborate and ammonium pentaborate. When in solution, most of the alkali metal borates are strongly alkaline and in the preferred embodiment of this invention, the alkali metal borates are blended with boric acid so that a substantially neutral solution is formed. Thus, in a preferred embodiment of the invention, the inorganic borate is added as a 1:1 weight ratio of borax to boric acid.

The second required constituent of the aqueous phase is from about 0.5% to about 2% by weight of an alkaline lignin sulfonate such as the sodium, potassium, calcium and ammonium lignin sulfonates. The preferred materials are the calcium lignin sulfonates which are sold under trade names such as "Marasperse C" and "Norlig A."

If desired, other soluble inorganic salts, such as the chromates and arsenates, can also be incorporated in the water phase for additional preservative value.

In the oil phase is included, for excellent preservative value, about 0.1% to about 10% by weight of a wood preservative such as the chlorinated phenols. Typical chlorinated phenols are pentachlorophenol, 2,4,5,6-tetrachlorophenol and 2,4,6-trichlorophenol.

The oil phase also contains from about 0.5% to about 25% by weight of a hydrocarbon wax, which serves to dimensionally stabilize the wood and to prevent leaching of the preservatives and fire retardants by weathering. The waxes which can be employed are the well-known hydrocarbon waxes, such as paraffin wax, microcrystalline waxes, and petrolatum, as well as the chlorinated derivatives thereof.

The oil itself in the oil phase consists of any of the distilled petroleum products, such as light and heavy mineral spirits, diesel oil, kerosene, gas oil, toluene, ligroin, benzene, gasoline, and the like. The oil phase can consist of one of the oils or a mixture of distilled petroleum products.

In the impregnation of wood with the emulsions of this invention, the wood and emulsion are placed in an autoclave or like pressure vessel and heated to a temperature of from about ambient to about 120° C. at an elevated pressure of from about atmospheric pressure to about 200 p.s.i.g. At a preferred pressure of from about 125 to about 175 p.s.i.g. and temperature in the range of about 50° C. to about 100° C., substantially all timbers can be impregnated with desirable amounts of ingredients in from about 2 to 12 hours.

The following examples are presented to illustrate the invention, but are not intended to be considered as limiting the invention to the specific examples given.

Example I

A saturated brine was prepared by dissolving 5.4 pounds of boric acid and 5.4 pounds of borax (sodium tetraborate decahydrate) in 3 gallons of water. The solution was placed in a colloid mill and 0.7 pound of "Marasperse C" (a calcium lignin sulfonate) was added. The mill was turned on and an oil solution consisting of 16 pounds of Chevron 110 (a petrolatum wax) and 4 pounds of pentachlorophenol dissolved in a mixture of 3.5 gallons of diesel oil and 2.0 gallons of kerosene, was slowly added at a slower rate. The emulsion was recycled through the mill until all of the oil solution was added. The resultant stable, oil-in-water emulsion had an oil:water phase weight ratio of 1.75:1 in which the average particle diameter of the oil phase was about 2 microns.

The emulsion and a block of seasoned red oak were placed in an autoclave. The autoclave was kept under a pressure of 150 p.s.i.g. at a temperature of 90° C. for a period of twelve hours. The block was removed and found to have an emulsion retention of 29 lbs./ft.$^3$. Deposited in the wood were:

| | Lb./ft.$^3$ |
|---|---|
| Pentachlorophenol | 0.92 |
| Wax | 3.7 |
| Borate | 4.4 |

Example II

A saturated brine was prepared as described in Example I. An oil solution containing 0.6 pound of pentachlorophenol and 0.6 pound of paraffin wax dissolved in 5 gallons of light mineral spirits (sp. gr.=0.784) was added at a slower rate than the aqueous phase as described above. The resultant stable oil-in-water emulsion had an oil:water phase ratio of 2:1 and oil phase particle diameter of 1–4 microns.

The emulsion and a block of seasoned southern pine were placed in an autoclave and heated at 82° C. for 2 hours under a pressure of 175 p.s.i.g. Deposited in the wood were:

| | Lbs./ft.$^3$ |
|---|---|
| Borate | 3.8 |
| Pentachlorophenol | 0.25 |
| Wax | 0.25 |

Thus, as can be seen from the foregoing specification, I have provided novel, stable oil-in-water emulsion compositions which can be used in a facile, single-step method for preserving and fireproofing wood.

Other modes of applying the principle of the invention may be employed, change being made as regards the details described, provided the features stated in any of the following claims or the equivalent of such be employed.

I, therefore, particularly point out and distinctly claim as my invention:

1. A stable, oil-in-water emulsion having an oil-to-water phase weight ratio in the range of from about 1:1 to about 2.5:1, comprising a water phase containing from about 5% to about 40% by weight of an inorganic oxygen-bearing borate selected from boric acid, the water-soluble alkali metal and ammonium salts thereof, and mixtures thereof and from about 0.5% to about 2% by weight of alkaline lignin sulfonate, and an oil phase containing about 0.1% to about 10% by weight of a chlorinated phenol and from about 0.5% to about 25% by weight hydrocarbon wax dissolved in distilled petroleum oil, said oil phase having an average particle diameter of not more than about seven microns.

2. An emulsion according to claim 1 in which said oil phase has an average particle diameter in the range of about 1 to 3 microns.

3. An emulsion according to claim 1 in which said inorganic oxygen-bearing borate is a mixture of borax and boric acid.

4. An emulsion according to claim 1 in which said oil-to-water phase ratio is in the range of about 1.5:1 to 2:1.

5. An emulsion according to claim 1 in which said chlorinated phenol is pentachlorophenol.

6. An emulsion according to claim 1 in which said alkaline lignin sulfonate is calcium lignin sulfonate.

7. The method of simultaneously preserving and fireproofing wood which comprises impregnating said wood with an oil-in-water emulsion comprising a water phase containing from about 5% to about 40% by weight of an inorganic oxygen-bearing borate and from about 0.5% to about 2% by weight of alkaline lignin sulfonate, and an oil phase containing from about 0.1% to about 10% by weight of a chlorinated phenol and from about 0.5% to about 25% by weight hydrocarbon wax dissolved in distilled petroleum oil, in which the weight ratio of said oil-to-water phases is in the range of from about 1:1 to about 2.5:1 and said oil phase has an average particle diameter of not more than about seven microns.

8. The method of claim 7 in which said wood is impregnated by heating in the presence of said emulsion at a temperature of from about ambient to about 120° C. and at a pressure of from about atmospheric pressure to about 200 p.s.i.g.

9. The method of claim 8 in which said temperature is from about 50° C. to about 100° C.

10. The method of claim 8 in which said pressure is from about 125 to about 175 p.s.i.g.

11. The method of claim 7 in which said inorganic oxygen-bearing borate is a mixture of borax and boric acid.

12. The method of claim 7 in which said chlorinated phenol is pentachlorophenol.

13. The method of claim 7 in which said alkaline lignin sulfonate is calcium lignin sulfonate.

References Cited

UNITED STATES PATENTS

| 2,381,487 | 8/1945 | Cook et al. | 106—15 |
| 2,523,626 | 9/1950 | Jones et al. | 106—15 X |
| 2,526,083 | 10/1950 | Nielsen | 106—15 |
| 2,693,424 | 11/1954 | Prescott | 106—27 X |
| 2,769,730 | 11/1956 | Sakornbut | 106—27 X |
| 2,935,471 | 5/1960 | Aarons et al. | 106—15 X |

ALEXANDER H. BRODMERKEL, *Primary Examiner.*

SAMUEL H. BLECH, DONALD J. ARNOLD,
*Examiners.*

J. B. EVANS, *Assistant Examiner.*

UNITED STATES PATENT OFFICE
CERTIFICATE OF CORRECTION

Patent No. 3,378,381                       April 16, 1968

Samuel M. Draganov

It is certified that error appears in the above identified patent and that said Letters Patent are hereby corrected as shown below:

Column 4, line 14, after "borate" insert -- selected from boric acid, the water-soluble alkali metal and ammonium salts thereof, and mixtures thereof --.

Signed and sealed this 19th day of August 1969.

(SEAL)
Attest:

Edward M. Fletcher, Jr.                    WILLIAM E. SCHUYLER, JR.
Attesting Officer                            Commissioner of Patents